US010322865B2

(12) United States Patent
Kwok

(10) Patent No.: US 10,322,865 B2
(45) Date of Patent: Jun. 18, 2019

(54) VACUUM FOOD STORAGE SYSTEM

(71) Applicant: Hop Shing Metal & Plastic Manufactory Ltd., Kwai Chung, Hong Kong (CN)

(72) Inventor: Chin Pang Kwok, Hong Kong (CN)

(73) Assignee: Hop Shing Metal & Plastic Manufactory Ltd., Kwai Chung (HK)

( * ) Notice: Subject to any disclaimer, the term of this patent is extended or adjusted under 35 U.S.C. 154(b) by 55 days.

(21) Appl. No.: 15/567,429

(22) PCT Filed: Nov. 27, 2015

(86) PCT No.: PCT/CN2015/095764
§ 371 (c)(1),
(2) Date: Oct. 18, 2017

(87) PCT Pub. No.: WO2016/169274
PCT Pub. Date: Oct. 27, 2016

(65) Prior Publication Data
US 2018/0111741 A1    Apr. 26, 2018

(30) Foreign Application Priority Data
Apr. 22, 2015 (CN) .................... 2015 2 0246467 U

(51) Int. Cl.
*B65D 81/20* (2006.01)
*A47J 47/10* (2006.01)

(52) U.S. Cl.
CPC .......... *B65D 81/2038* (2013.01); *A47J 47/10* (2013.01)

(58) Field of Classification Search
CPC ..... B65B 31/047; B65D 81/2038; A61J 47/10
See application file for complete search history.

(56) References Cited

U.S. PATENT DOCUMENTS 4,984,611 A * 1/1991 Takatsuki .............. B65B 31/047
141/65
5,195,427 A * 3/1993 Germano .............. B65B 31/047
141/65

(Continued)

FOREIGN PATENT DOCUMENTS

CN    102730300 A    10/2012
CN    202897173 U    4/2013
DE    10348119 A1    5/2005

OTHER PUBLICATIONS

International Search Report of PCT/CN2015/095764, dated Jan. 29, 2016.

*Primary Examiner* — Timothy L Maust
*Assistant Examiner* — Timothy P. Kelly
(74) *Attorney, Agent, or Firm* — Leydig, Voit & Mayer

(57) ABSTRACT

A vacuum food storage system includes a vacuum container having an air valve, and a cordless vacuum unit capable of being supported on top of the container for extracting air from the container through the air valve. To provide a more substantive visual indication of the presence of a vacuum in the container, a resilient seal between the vacuum unit and the container resiliently suspends the vacuum unit so that, as the vacuum increases, the entire vacuum unit is drawn down onto the container. A hands-free operation and more evocative audible indication of the presence of a vacuum is provided by employing a pressure-equalizing valve that abruptly opens to provide a channel between an interface chamber and ambient air when a vacuum sensor indicates a predefined vacuum level within the container.

20 Claims, 6 Drawing Sheets

(56) References Cited

U.S. PATENT DOCUMENTS

| | | | | |
|---|---|---|---|---|
| 7,246,555 B2* | 7/2007 | Small | ............... | A23L 3/0155 |
| | | | | 141/65 |
| 8,113,246 B2* | 2/2012 | Hsieh | ............. | B65D 81/2038 |
| | | | | 141/197 |
| 9,359,121 B1* | 6/2016 | Hsieh | ................. | B65B 31/00 |
| 2012/0199582 A1 | 8/2012 | Cai | | |

* cited by examiner

VACUUM FOOD STORAGE SYSTEM

TECHNICAL FIELD

The present invention relates to vacuum food storage systems of the type comprising a vacuum container having an air valve, and a cordless vacuum unit capable of being supported on the container for extracting air through the air valve.

BACKGROUND OF THE INVENTION

With prior art vacuum food storage containers, sometimes the only way for a user to check the presence of a vacuum was to open the container, whereupon the inward rush of air can be heard. For many users, this air noise is evocative of the presence of a vacuum and provides confidence in the storage system.

U.S. Pat. No. 7,246,555 describes cordless vacuum food storage system comprising a vacuum unit that rests on the lid of the container and uses a vacuum switch to monitor internal pressure so that a vacuum operation can take place unattended by the user to recharge vacuum lost during storage. This U.S. Pat. No. 7,246,555 patent publication also describes a more satisfactory way of providing an indication that vacuum is present in the container. Opposite sides of a diaphragm are exposed to internal and ambient pressures, and a poppet is fixed to the diaphragm so that an internal vacuum retracts the poppet, for a visual indication of the presence of a vacuum in the container, while a click spring that biases the poppet outwardly provides an audible indication of the same. Although a significant improvement compared to the old method, the visual impact of the poppet is small, due to its size and location, where it may easily be blocked from view by the vacuum unit. The audible "click" of the spring is helpful to indicate a vacuum, but it is unfamiliar and must be learned, since users do not intuitively associate such a noise with the presence of vacuum in a container.

The vacuum food storage system of U.S. Pat. No. 7,246,555 also employs a bayonet fastener, or tongue and groove fastener, for connecting the vacuum unit to the container. A drawback of this arrangement is that twisting and removing the vacuum unit is difficult and this is only partially mitigated by the cushions and ribs provided on the body to assist with gripping the unit.

It is an object of the present invention to overcome or substantially ameliorate the above disadvantages or, more generally, to provide an improved vacuum food storage system.

Disclosure of the Invention

According to one aspect of the present invention there is provided a portable vacuum food storage system comprising:

a container to store food;

a container air valve fixed in a first wall of the container, a counter face extending around the container air valve, the container air valve comprising a resilient valve member mounted externally to the container over an air passage communicating with an inside of the container, an inner side of the valve member normally closing the air passage, wherein application of a reduced pressure to an outer side of the valve member deflects to valve member outwardly to open the air passage;

a cordless vacuum unit including:

a vacuum nozzle with a seal for engaging the counter face so that engagement of the seal with the counter face closes an interface chamber located between the container and the vacuum nozzle, the seal comprising resilient material to resiliently suspend the vacuum unit in a stable manner for hand-free operation whereby the weight of the vacuum unit urges the seal against the counter face;

one of a projection and a complementary recess formed on the vacuum nozzle and the other of the projection and complementary recess formed on the container for locating the vacuum unit on the container, the projection and recess bounding the interface chamber;

a motorised vacuum pump for drawing air through the vacuum nozzle;

a control circuit including an on-off power switch to selectively provide power to the motorised vacuum pump;

a vacuum sensor in the control circuit to generate a vacuum signal indicative of a vacuum level within the container;

a pressure-equalising valve openable to provide a channel between the interface chamber and ambient air, and wherein the control circuit further comprises a controller that abruptly opens the pressure-equalising valve after receiving a vacuum signal indicative of a predefined vacuum level within the container.

Preferably the seal comprises a circumferential lip that bends inwardly as the seal is compressed axially. Optionally, the seal may comprise multiple lips, or have a concertina-like form, to provide a greater degree of deflection of the seal and movement of the vacuum unit under vacuum.

Preferably the lip is inclined to extend radially inwardly, as well as axially.

Preferably the seal extends around a perimeter of the vacuum nozzle, wherein the projection is formed on the vacuum nozzle adjacent the seal and the projection is capable of supporting the vacuum unit upright on a horizontal surface with the seal spaced apart from the horizontal surface.

Preferably the container air valve further comprises a resilient cover over the valve member and a lever disposed between the cover and the valve member, the lever having opposing ends abutting the valve member and cover with a fulcrum therebetween, such that pushing the cover inwardly into the container moves at least part of the valve member outwardly to open the air passage.

Preferably the first wall comprises a portion of a lid of the container.

Preferably the vacuum nozzle closes a lower end of a housing that encloses the motorised vacuum pump, vacuum sensor, pressure-equalising valve and the controller.

Preferably the on-off power switch is mounted to an upper end of the housing.

Preferably the seal has a convex outer surface aligned substantially tangentially with an adjacent outer surface of the housing.

The invention provides a vacuum storage system which is effective and efficient in operational use, and the resilient suspension of the vacuum unit means that, as the vacuum increases, the entire vacuum unit is drawn down onto the container. The abrupt opening of the pressure-equalising valve causes an audible air flow or "pop", at the same time as which the entire vacuum unit pops up. The result is thus a more substantive visual indication of the presence of vacuum, combined with a more evocative audible indication of the presence of vacuum. Moreover, the system has an overall simple design which minimizes manufacturing costs and maximizes performance, as well as simplifying maintenance.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figure 2:
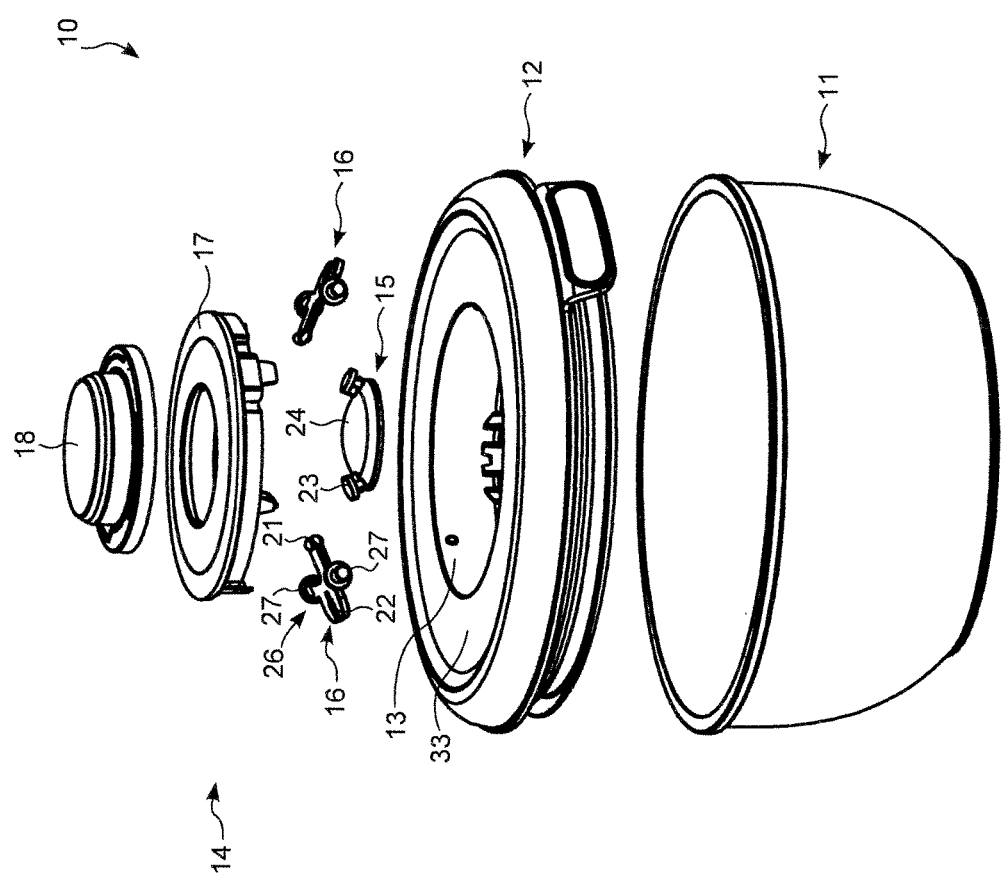
FIG. 2 is an exploded view of a preferred embodiment of the container assembly of the system of the invention.

Referring to FIG. 2, a vacuum container assembly 10 comprises a vacuum food storage container 11, the open top of which is sealed closed by a lid 12. Mounted in a recess 13 in an upper side of the lid 12 is a container air valve 14 generally comprising a resilient valve member 16, levers 16, a mounting ring 17 and a resilient cover 18. The container air valve 14 may be mounted generally coaxially with a central axis 19 of the lid 12 and of the container 11.

One longitudinal end 21 of each lever 16 may be rounded for abutting the underside of the cover 18, while the opposing end 22 may be bifurcate for abutting the valve member, and receiving a nub 23 projecting from a domed outer surface 24 of the valve member 15. The nubs 23 may be diametrically opposite one another and opposing ends 21, 22 of each lever 16 offset transversely from one another. Positioned longitudinally between the opposing ends 21, 22 is a fulcrum 26 formed from coaxial axle projections 27 on either side of the lever 16.

Figure 1:
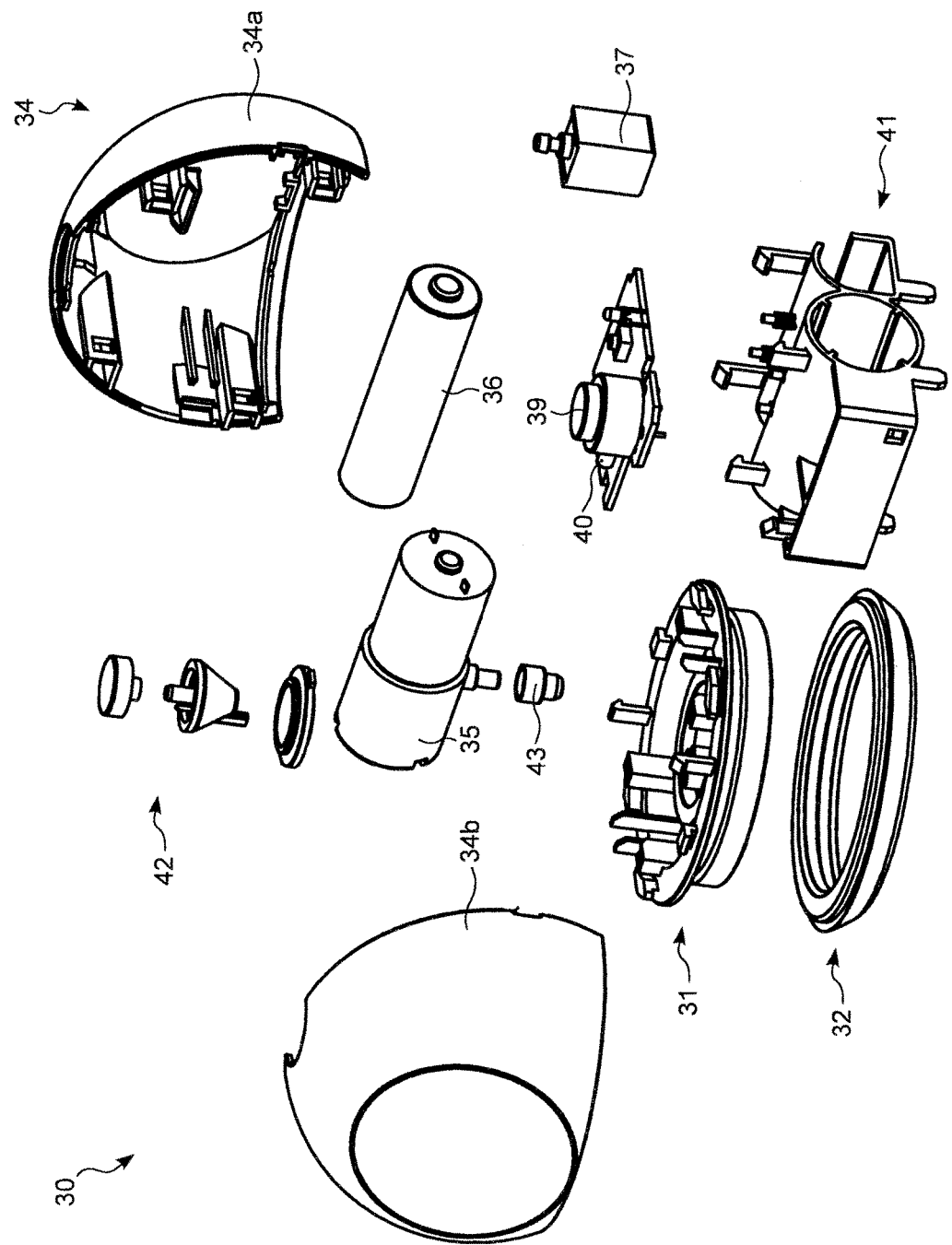
FIG. 1 is an exploded view of a preferred embodiment of the vacuum unit of the system of the invention.

FIG. 1 illustrates the cordless vacuum unit 30, which includes a vacuum nozzle 31 with a seal 32 for engaging an annular counter face 33 on the lid 12. The vacuum nozzle 31 closes a lower end of a housing 34 comprising shells 34a, 34b that enclose a motorised vacuum pump 35, battery 36, solenoid-actuated pressure-equalising valve 37 and a printed circuit board 38 carrying a vacuum sensor 39 and a controller 40. A frame 41 mounts these internal components to the housing 34 and vacuum nozzle 31. An on-off power switch assembly 42 is used to selectively provide power to the motorised vacuum pump 35. A coupling 43 connects the motorised vacuum pump 35 to the vacuum nozzle 31 in an airtight manner.

Figure 3:
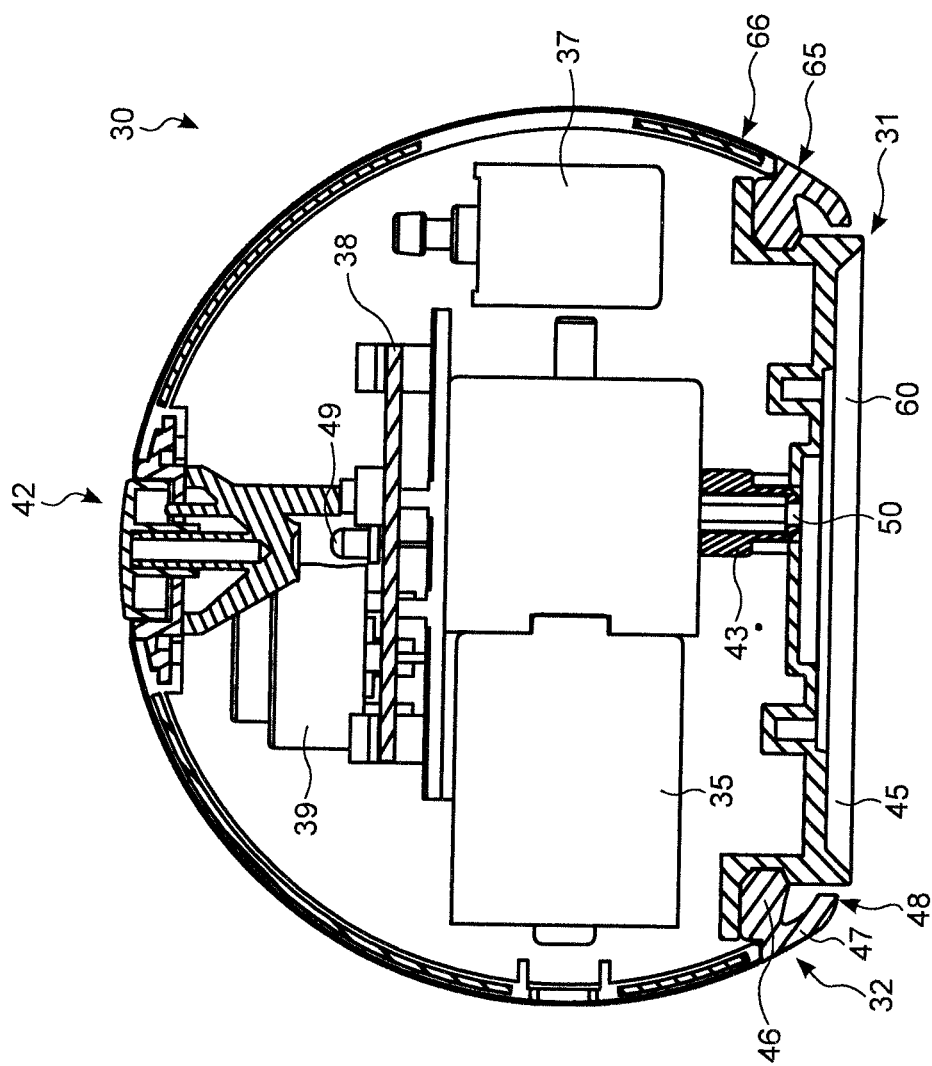
FIG. 3 is a section in an upright plane through the vacuum unit of FIG. 1.

FIG. 3 shows the vacuum nozzle 31 fixed to the body 34 to enclose the internal components. The body 34 may be partly spherical and symmetrical about a respective upright central axis, with the seal 32 extending around the perimeter of the generally circular vacuum nozzle 31 and the on-off power switch assembly 42 at the apex of the body. The body 34 thus also presents an ergonomically advantageous form, allowing it to be easily grasped, lifted and turned on, without particular regard to its angular orientation about the upright central axis. A projection 45 is formed on the vacuum nozzle 31 adjacent the seal 32 and serves to locate the nozzle 31 in registration with the recess 13 in which it is received in use. The projection 45 is also capable of supporting the vacuum unit 30 upright on a horizontal surface with the seal 32 spaced apart from the horizontal surface, thus assisting in keeping the seal 32 clean and uncompressed when not in use.

The seal 32 is preferably elastomeric and comprises a block portion 46 fixed in a channel of complementary shape in the perimeter of the vacuum nozzle 31. Integral with the block portion 46 is a lip 47 with a free end 48 that abuts the counter face 33. Between its attachment to the block portion 46 and the free end 48, the lip 47 extends axially and is inclined to extend radially inwardly. The radius of curvature of the lip 47 may decrease toward the free end 48. The seal 32 has a convex outer surface 65 aligned substantially tangentially with an adjacent spherical outer surface 66 of the housing.

A light-emitting diode 49 may be mounted on the printed circuit board 38 for transmitting light through a translucent button of the on-off power switch assembly 42 or else through an annular lens extending around the on-off power switch assembly 42. A channel 50 through the vacuum nozzle 31 is provided for transfer of air into and out of a space or interface chamber 60 located between the container 10 and the vacuum nozzle 31, immediately outside the vacuum nozzle 31.

Figure 4:
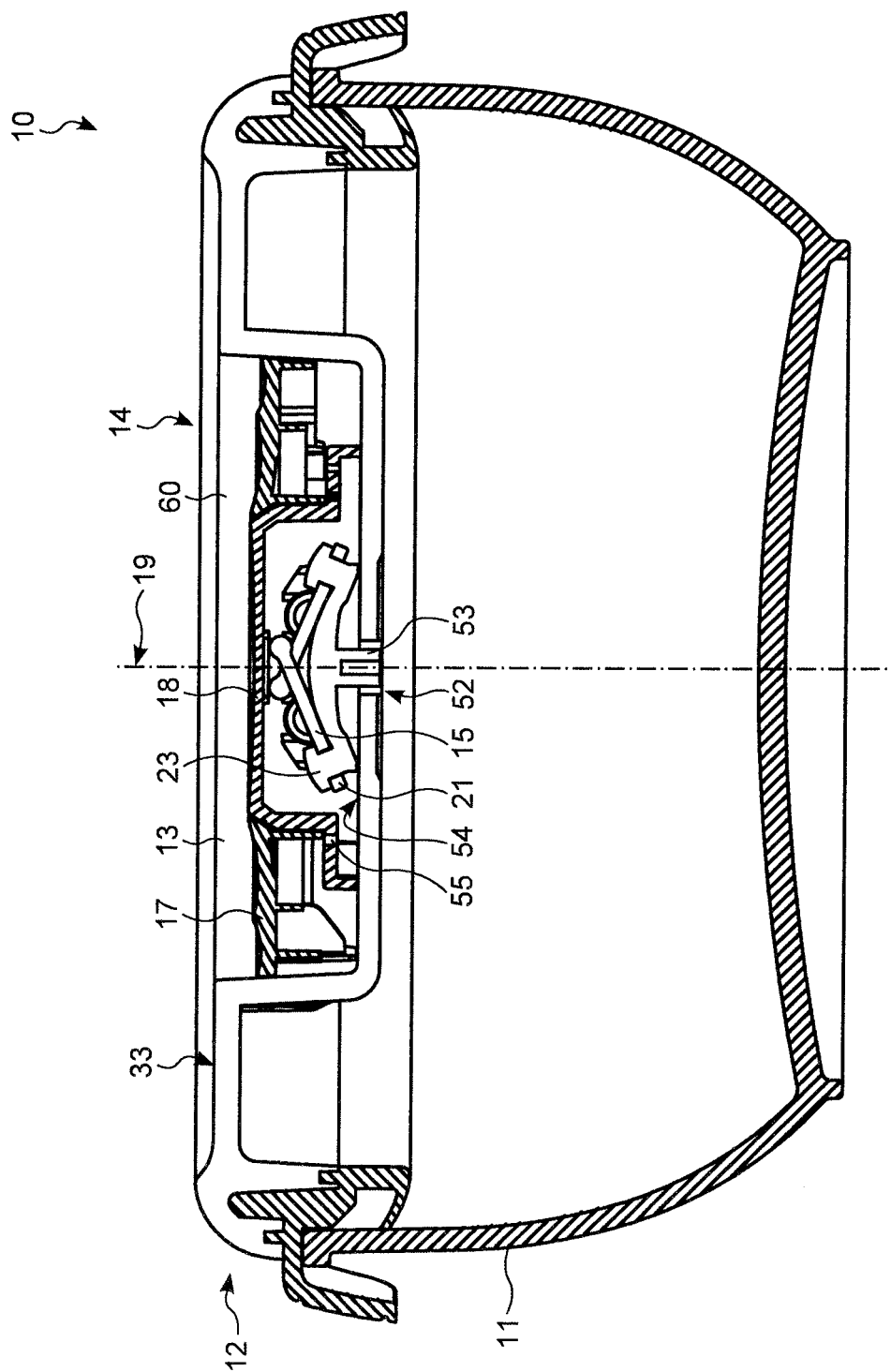
FIG. 4 is a section in an upright plane through the container assembly of FIG. 12.

As shown in FIG. 4, the lid 12 includes an air passage 52 in a base of the recess 13 for transfer of air in and out of the container 11. The valve member 15 is elastomeric and has a mushroom shape with a stem 53 received in the passage 52 and, in the normally closed position shown, the head of the valve member 15 is sealed against the outer surface 54 of the base of the recess 13 to close the passage 52.

The cover 18 may also be formed of elastomeric material and includes perforations 55 to permit air to pass through it when the valve member 15 is open.

The levers 16 are aligned so that their longitudinal axes extend generally diametrically. The levers 16 are disposed between the cover 18 and the valve member 15, with their ends 22 fixed to respective nubs 23 located near the periphery of the valve member 15 and the axle projections 27 supported on the surface 24, so that the ends 21 lie next to, or abut, an inner side of the cover 18 proximate the axis 19.

In use, to make opening the lid easier, vacuum is released by pushing the cover 18 inwardly into the container 11, providing the familiar noise as air rushes into the container. The inner surface of the cover 18 pushed down thereby abuts the ends 21, rotating the levers 16 about their fulcrums 26 to lift at least peripheral parts of the valve member 15 away from sealing engagement with the outer surface 54, an thereby opening the air valve 14.

Figure 5:
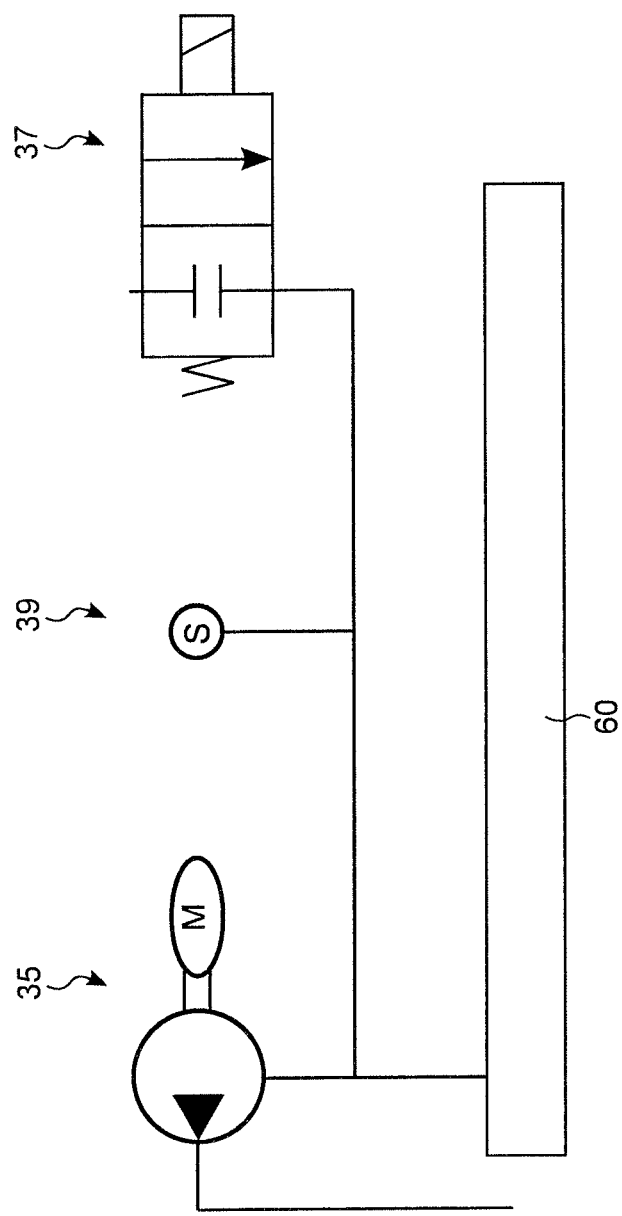
FIG. 5 is a schematic of the air circuit of the vacuum unit of FIG. 1.

FIG. 5 schematically illustrates the air circuit of the vacuum unit 30. The vacuum sensor 39 and pressure-equalising valve 37 are both connected to the inlet side of the motorised vacuum pump 35, to an air line extending between the interface chamber 60 and the motorised vacuum pump 35.

Figure 6:
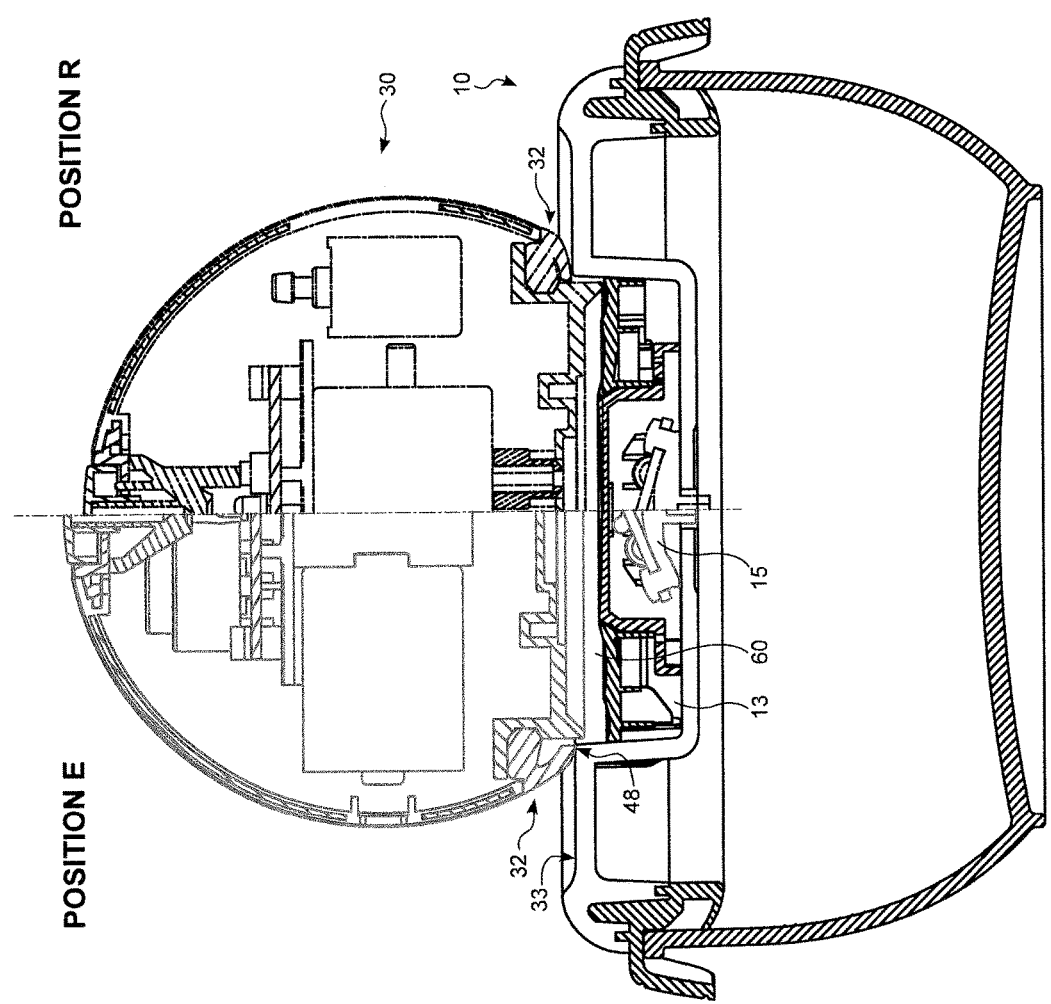
FIG. 6 is a section in an upright plane through the container assembly of FIG. 2 to which the vacuum unit of FIG. 1 is mounted in a fragmentary view showing two operating positions.

To store food, the vacuum unit 30 is used to extract air from the closed container. With reference to FIG. 6, the vacuum unit 30 is placed on top of the lid 12 in Position E, in which the projection 45 is received in the complementary recess 13 to correctly locate the vacuum unit. The free end 48 of the seal is urged by the weight of the vacuum unit 30 against the counter face 33, thereby sealing the interface chamber 60. In this position, a volume of air is present in the interface chamber 60 i.e. the space bounded by the vacuum nozzle 31, the seal 32, the wall of the recess 13 and the valve member 15. In this Position E the seal 32 also resiliently supports the weight of the vacuum unit 30.

The user then presses the on off switch assembly 42 to start the motorised vacuum pump 35 which quickly extracts air from the interface chamber 60, such that reduced pressure to an outer side of the valve member 15 deflects the valve member 15 outwardly to open the air passage. As the vacuum pump 35 continues the increasing pressure differential draw the vacuum unit 30 further and further down onto the lid 12, bending the lip 47 inwardly until the seal 32 is fully compressed axially, as shown at Position R. The movement of the entire vacuum unit 30 provides a clear visual indication of the presence of a vacuum, and this might be further enhanced by providing, for instance, a contrasting coloured band adjacent the free end 48 which is hidden when the seal is fully compressed.

After being switched on, the controller 40 monitors the vacuum signal from the vacuum sensor 39 and, after receiving a vacuum signal indicative of a predefined vacuum level within the container 11, the controller 40 sends a trigger signal to the solenoid to abruptly open the pressure-equalising valve 37. The abrupt opening of the pressure-equalising valve 37 causes an audible air flow or "pop", at the same time as which the entire vacuum unit pops up as the seal 32 is decompressed and the pressure is equalised. The noise of this air flow provides an evocative audible indication of the presence of vacuum, without the need to open the container. Moreover, once the vacuum has been released in this manner, the vacuum unit 30 may be simply lifted off the lid 12, without the need to disconnect a mechanical coupling.

Aspects of the present invention have been described by way of example only and it should be appreciated that modifications and additions may be made thereto without departing from the scope thereof.

The invention claimed is:

1. A portable vacuum food storage system comprising:
a container for storing food;
a container air valve fixed in a first wall of the container, wherein
   the container has an inside and a counter face extending around the container air valve, and
   the container air valve comprises a resilient valve member externally mounted on the container, over an air passage communicating with the inside of the container, and including an inner side normally closing the air passage, and application of a reduced pressure to an outer side of the resilient valve member deflects the resilient valve member outwardly, thereby opening the air passage;
a cordless vacuum unit including a vacuum nozzle with a seal for engaging the counter face so that engagement of the seal with the counter face closes an interface chamber located between the container and the vacuum nozzle, wherein the seal comprises resilient material for resiliently suspending the cordless vacuum unit for hands-free operation, whereby weight of the cordless vacuum unit urges the seal against the counter face;
a projection and a complementary recess, wherein
   one of the projection and the complementary recess is located on the vacuum nozzle,
   the other of the projection and the complementary recess is located on the container for locating the cordless vacuum unit on the container, and
   the projection and the complementary recess bound the interface chamber;
a motorised vacuum pump for drawing air through the vacuum nozzle;
a control circuit including an on-off power switch selectively providing power to the motorised vacuum pump, a controller, and a vacuum sensor generating a vacuum signal indicative of vacuum level within the container; and a pressure-equalising valve openable to provide a channel between the interface chamber and ambient air, wherein the controller abruptly opens the pressure-equalising valve upon receiving a vacuum signal indicative of a predefined vacuum level within the container from the vacuum sensor.

2. The portable vacuum food storage system of claim 1, wherein the seal comprises a circumferential lip that bends inwardly as the seal is compressed axially.

3. The portable vacuum food storage system of claim 2, wherein the lip is inclined to extend radially inwardly, as well as axially.

4. The portable vacuum food storage system of claim 1, wherein
   the seal extends around a perimeter of the vacuum nozzle,
   the projection is located on the vacuum nozzle, adjacent the seal, and
   the projection is capable of supporting the cordless vacuum unit upright on a horizontal surface with the seal spaced apart from the horizontal surface.

5. The portable vacuum food storage system of claim 1, wherein
   the container air valve further comprises a resilient cover over the resilient valve member and a lever disposed between the cover and the resilient valve member,
   the lever has opposing ends abutting the resilient valve member and the cover, and a fulcrum the opposing ends, such that pushing the cover inwardly into the container moves at least part of the resilient valve member outwardly and opens the air passage.

6. The portable vacuum food storage system of claim 1 including a lid for the container, wherein the first wall comprises a portion of the lid.

7. The portable vacuum food storage system of claim 1 including a housing that encloses the motorised vacuum pump, the vacuum sensor, the pressure-equalizing valve, and the controller, wherein the vacuum nozzle closes a lower end of the housing.

8. The portable vacuum food storage system of claim 7, wherein the on-off power switch is mounted to an upper end of the housing.

9. The portable vacuum food storage system of claim 7, wherein the seal has a convex outer surface aligned substantially tangentially with an adjacent outer surface of the housing.

10. The portable vacuum food storage system of claim 2, wherein
   the seal extends around a perimeter of the vacuum nozzle,
   the projection is located on the vacuum nozzle, adjacent the seal, and
   the projection is capable of supporting the cordless vacuum unit upright on a horizontal surface with the seal spaced apart from the horizontal surface.

11. The portable vacuum food storage system of claim 3, wherein
   the seal extends around a perimeter of the vacuum nozzle,
   the projection is located on the vacuum nozzle, adjacent the seal, and
   the projection is capable of supporting the cordless vacuum unit upright on a horizontal surface with the seal spaced apart from the horizontal surface.

12. The portable vacuum food storage system of claim 2, wherein
   the container air valve further comprises a resilient cover over the resilient valve member and a lever disposed between the cover and the resilient valve member, the lever has opposing ends abutting the resilient valve member and the cover, and a fulcrum the opposing ends, such that pushing the cover inwardly into the container moves at least part of the resilient valve member outwardly and opens the air passage.

13. The portable vacuum food storage system of claim 3, wherein the container air valve further comprises a resilient cover over the resilient valve member and a lever disposed between the cover and the resilient valve member, the lever has opposing ends abutting the resilient valve member and the cover, and a fulcrum the opposing ends, such that pushing the cover inwardly into the container moves at least part of the resilient valve member outwardly and opens the air passage.

14. The portable vacuum food storage system of claim 4, wherein the container air valve further comprises a resilient cover over the resilient valve member and a lever disposed between the cover and the resilient valve member, the lever has opposing ends abutting the resilient valve member and the cover, and a fulcrum the opposing ends, such that pushing the cover inwardly into the container moves at least part of the resilient valve member outwardly and opens the air passage.

15. The portable vacuum food storage system of claim 2 including a lid for the container, wherein the first wall comprises a portion of the lid.

16. The portable vacuum food storage system of claim 3 including a lid for the container, wherein the first wall comprises a portion of the lid.

17. The portable vacuum food storage system of claim 4 including a lid for the container, wherein the first wall comprises a portion of the lid.

18. The portable vacuum food storage system of claim 5 including a lid for the container, wherein the first wall comprises a portion of the lid.

19. The portable vacuum food storage system of claim 2 including a housing that encloses the motorised vacuum pump, the vacuum sensor, the equalizing valve, and the controller, wherein the vacuum nozzle closes a lower end of the housing.

20. The portable vacuum food storage system of claim 3 including a housing that encloses the motorised vacuum pump, the vacuum sensor, the equalizing valve, and the controller, wherein the vacuum nozzle closes a lower end of the housing.

* * * * *